United States Patent [19]
Swanson

[11] Patent Number: 5,516,742
[45] Date of Patent: May 14, 1996

[54] CATALYTIC CONVERSION OF WATER AND CARBON DIOXIDE TO LOW COST ENERGY, HYDROGEN, CARBON MONOXIDE, OXYGEN AND HYDROCARBONS

[76] Inventor: Rollin C. Swanson, 9-A Dunwood Rd., Manorhaven, N.Y. 11050

[21] Appl. No.: 313,433

[22] Filed: Sep. 27, 1994

[51] Int. Cl.$^6$ .................................................. B01J 23/02
[52] U.S. Cl. ........................ 502/340; 502/100; 502/174; 423/430; 423/432
[58] Field of Search .................................... 502/100, 174, 502/340; 423/430, 432

[56] References Cited

U.S. PATENT DOCUMENTS

| | | | |
|---|---|---|---|
| 534,177 | 2/1895 | Rueff | 423/432 |
| 4,206,062 | 6/1980 | Derbyshire et al. | 252/33.2 |
| 5,230,734 | 7/1993 | Kumasaka et al. | 106/464 |

Primary Examiner—Shrive Beck
Assistant Examiner—Timothy H. Meeks

[57] ABSTRACT

The present invention is a novel process for producing low cost energy, hydrogen, hydrocarbons, carbon monoxide, and oxygen by reacting carbon dioxide and water over a catalyst complex to form low cost energy, various weight hydrocarbons, carbon monoxide and hydrogen which may be used as fuels or for other purposes. The low cost energy results from the heat generated by the exothermic nature of the reaction and is evidenced by the increased temperature of the reactor during the reaction. Said catalyst complex is made from a hydrated magnesium carbonate/hydroxide complex and a catalyst support. The reactants are carbon dioxide and water. This reaction is intended to be used at sites where excess steam, heat or carbon dioxide are produced and are readily available. The recycle of these otherwise excess "waste" products can be economically advantageous by producing useful products and be environmentally advantageous by reducing both greenhouse gas emissions and thermal exhaust. Moreover, if desired, a fuel may be added to the process, e.g., coal, to further the production of organics.

13 Claims, 1 Drawing Sheet

CATALYTIC CONVERSION OF WATER AND CARBON DIOXIDE TO LOW COST ENERGY, HYDROGEN, CARBON MONOXIDE, OXYGEN AND HYDROCARBONS

BACKGROUND OF THE INVENTION

This invention presents a novel way of producing energy and hydrocarbons inexpensively. The reactants in this method are carbon dioxide and water, which are reacted over a novel catalyst complex comprised of a magnesium hydroxide/carbonate complex to form low cost energy, hydrogen, hydrocarbons, carbon monoxide, and oxygen which may be used as fuels and/or other useful products.

SUMMARY OF THE INVENTION

The present invention is a novel process for producing low cost energy, hydrogen, hydrocarbons, carbon monoxide, and oxygen by reacting carbon dioxide and water over a catalyst complex. Said catalyst complex is formed from a magnesium hydroxide/carbonate complex, and preferably, a catalyst support. The reactants are carbon dioxide and water.

DETAILED DESCRIPTION OF THE INVENTION

Figure 1:
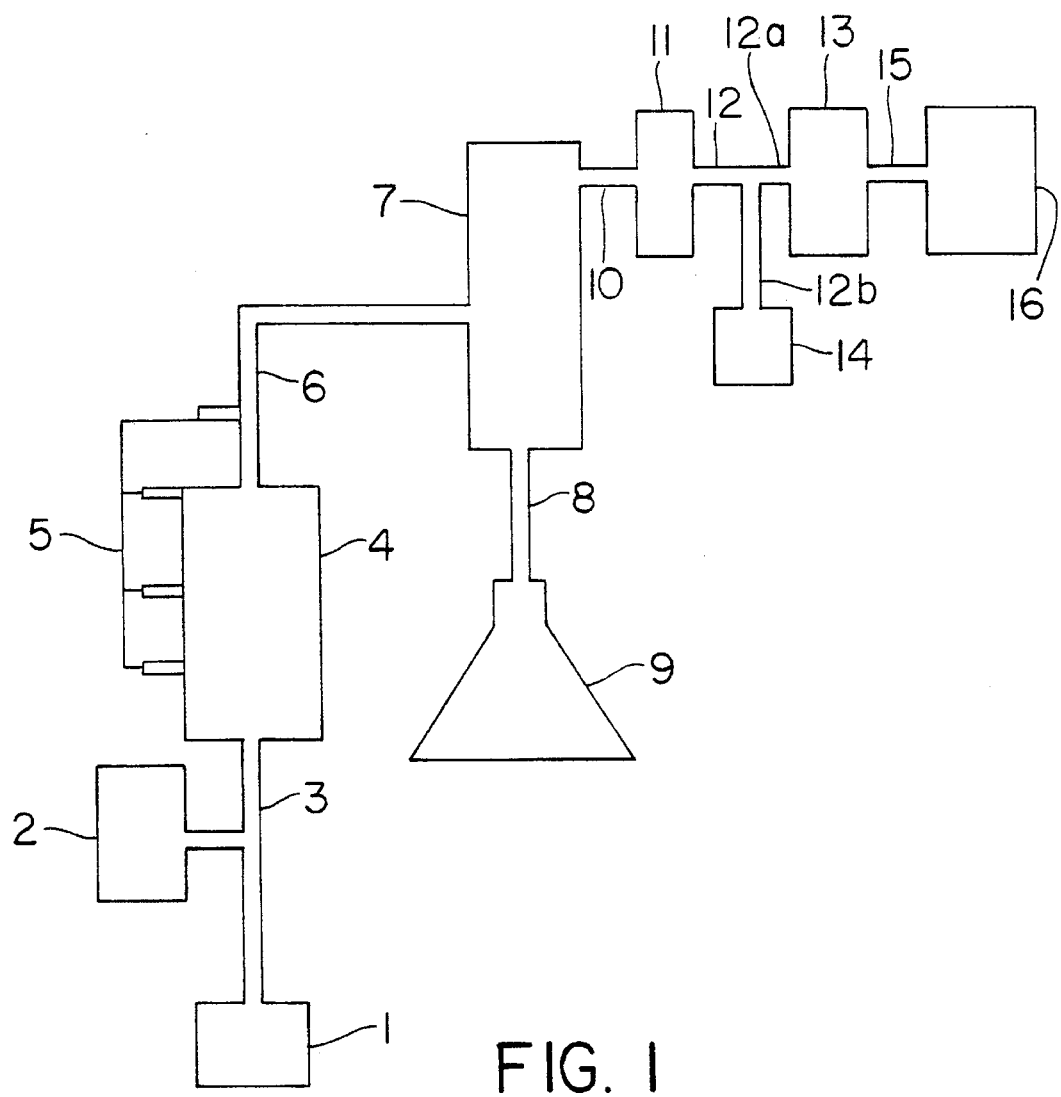
FIG. 1 illustrates an exemplary model for a reaction of the present system.

The present invention comprises the reaction of carbon dioxide and water over a catalyst to form low cost energy, hydrogen, hydrocarbons, carbon monoxide and oxygen which may be used as fuels or for other purposes. The low cost energy results from the heat generated by the exothermic nature of the reaction and is evidenced by the increased temperature of the reactor during the reaction. $CO_2$ is used to maintain the catalyst's composition. This reaction is intended to be used at sites where excess steam, heat or carbon dioxide are produced and are readily available. The recycle of these otherwise excess "waste" products can be economically advantageous by producing useful products and be environmentally advantageous by reducing greenhouse gas emissions. Moreover, if desired, a fuel may be added to the process, e.g., coal, to further the production of organics. Another advantage of the present invention is that since other fuels will react at the reaction conditions, the feed streams may be "dirty", that is the feed may contain other emissions. For example, the stream may contain sulfur compounds, nitrogen compounds, and carbon monoxide (CO), all of which will react over the catalyst complex.

Catalyst Complex

The catalyst complex for use in the present invention is formed from a magnesium hydroxide/carbonate complex, the preferred of which is mainly $(MgCO_3)_4Mg(OH)_2 \cdot 5H_2O$, though other similar complexes may be used, for example, $MgCO_3 \cdot Mg(OH)_3 \cdot 3H_2O$ (artinite) and $(MgCO_3)_3Mg(OH)_2 \cdot 3H_2O$ (hydromagnesite). Such material is relatively inexpensive and available and may be obtained from such mineral sources as dolomite, magnesite, artinite, lansfornite, nequeronite and brucite. The photosynthetic properties of magnesium and the low temperature formation of the carbide, make it particularly amenable for use in the catalyst complex. While in some cases magnesium has been found to behave like zinc and in other cases it behaves like an alkaline earth metal, it is believed that it is the combination of these properties that make it particularly well suited as part of the catalyst complex used in the reaction contemplated herein. Coal, coal precursors (e.g., lignite or peat), or coke may be added to the catalyst during the formation of the catalyst, or the mounting of the catalyst on the support. The coal acts both as a support for the magnesium hydroxide/carbonate complex and as a reactant that is consumed during the reaction to produce a higher volume percent of organics.

Moreover, calcium carbonate ($CaCO_3$) may be added to enhance the function of the catalyst, which may be added at up to 10 weight percent of the complex. In addition, some metal phosphate, for example $K_2PO_4 \cdot 3H_2O$, may be added to the catalyst with the complex at up to about 2 weight percent of the complex. The grade of the complex, calcium carbonate, or metal phosphate need not be of high purity for the present invention to function.

The magnesium carbonate/hydroxide complex is placed in a pressurized chamber. Alternatively, formic acid mixed with magnesium hydroxide, magnesium oxide, or magnesium carbonate can be used as the complex. Water and carbon dioxide are added. The preferred ratio of water to $MgCO_3$—OH complex is approximately 900 grams of water per 100 grams of $MgCO_3$—OH complex. However, ratios of 2 to 24 weight percent $MgCO_3$—OH complex can be used depending upon the temperature. Carbon dioxide is added so that the chamber is pressurized. Pressures ranging from near atmospheric to the pressure to liquefy $CO_2$ can be used. For example, pressures between 200 and 780 psig may be used. However, pressures adequate to liquefy $CO_2$ are preferred. The residence time under pressure is from an hour to preferably 72 hours or more at a temperature between $-2°$ and $+4°$ C. The catalyst may be removed from the chamber as soon as it has been rendered water soluble, for instance, possibly as a formate complex. The catalyst is removed from the chamber in a solid or liquid form. It is believed that the magnesium carbonate/hydroxide complex solubilizes in the water under this high carbon dioxide pressure to form a formate complex.

A catalyst support such as coal, coke, or petroleum coke may be added to the reactor, or added during the tumble drying of the catalyst. In the latter case, a catalyst support is added and mixed with the complex in a rotating flask. The catalyst support may consist of 65–85% silica aluminate and 15–35% aluminum oxide, with the preferred percentages being about 80% and 20%, respectively. Supports such as steel or iron supports may also be used to support the catalyst. Alternatively, if coal or its coke form, petroleum coke, graphite or other organic matter having a low hydrogen content is used as the support and charged to the chamber along with the catalyst complex, no additional support is necessary. The amount of coal used can range from about 0 to 97 weight percent of the total amount of catalyst plus support.

After the catalyst complex is formed, the pressure in the chamber is released. The carbon dioxide may be recovered during such release for reuse. The catalyst complex is dried using a rotating flask with a warmer or by desiccating at room temperature. The catalyst complex is deemed dry when it tumbles freely in the rotating flask and has no dark moisture spots.

Apparatus

FIG. 1 illustrates an exemplary model for a reaction of the present system. A water storage tank having a water pump 1 and a carbon dioxide ($CO_2$) storage tank with a pressure gauge 2 are connected by inlet lines 3 for transporting water and carbon dioxide to a reactor 4. Three thermocouples 5 are placed in the reactor 4 to measure the temperature of the reactor 4 and one thermocouple 5 is placed above the reactor 4 to both measure the temperature above the reactor 4 and to add heat. An outlet line 6 is used to attach a water-cooled condenser 7 to the reactor 4 so that some of the product liquifies. The bottom of the water-cooled condenser 7 is attached by a second outlet line 8 to a liquid collector 9. The remaining gases which are not liquified pass through a third outlet line 10 attached to the top of the water-cooled condenser 7 and a back pressure regulator 11. The back pressure regulator 11 is connected to a fourth outlet line 12 which divides into two lines, one line 12a leading to a scrubber 13 and the other line 12b leading to a collection bag 14. The scrubber 13 is attached to a fifth line 15, which is attached to different collection bag 16. The gases passes through the fourth lines 12 and 12b, unscrubbed, and through the fourth line 12 and 12a and fifth line 15, scrubbed, and are collected in bags 14 and 16, respectively. These bags are sent to a lab for analysis.

Reaction

The catalyst complex is placed in the reactor 4. Since various forms of magnesium formate catalyst complex are used as the starting material, specific weights of the derived forms are not ascertainable. An exemplary reactor system for use with the present invention is depicted in FIG. 1. The amount of catalyst complex in the reactor 4 required varies and depends on the size of the reactor 4, the flow streams of the carbon dioxide and water, and the desired residence time of the carbon dioxide and water in the reactor 4. However, generally, the reactor 4 should be packed so that there at least 0.03 grams of catalyst complex per cc of reactor 4. Moreover, there should be enough space in the reactor 4 so that the catalyst complex may become a fluidized bed in the gaseous stream. Additionally, sufficient catalyst complex is required for there to be a high level of contact and interaction between the catalyst complex and the water and carbon dioxide entering through the inlet lines 3. Given the economics of the reaction, it is preferable to run the reaction as a continuous process, rather than a batch process, though both types of reaction may be used.

The heater for the reactor 4 is initially heated to a temperature of between 180° C. and 240° C. Since the reaction is exothermic, much low cost energy is generated. This is evidenced by the rise in temperature of the reactor 4 after the initial heating. Due to the exotherm, the temperature can easily exceed 600° C. The temperature should be kept at about 450° C. to 760° C., or alternatively 760° C. to 850° C. Above 600° C. the reaction does not proceed as readily, it is believed, because the carbide form of magnesium, which is believed to be an intermediate in the reaction, may not be able to form. It is also believed that the water and the carbon dioxide (i.e., the inlet lines 3 into the reactor 4) may be preheated to the reactor temperature. In larger reactors, it is believed that such preheating may be accomplished by using steam instead of water in one of the inlet lines 3 and using that steam to heat the carbon dioxide directly when the inlet lines 3 mix. The reactor 4 should be heated to maintain the temperature of the reactor 4 during the process.

The inlet lines 3 are pressurized to pressures between 300 and 400 psig in the experimental set up employed by the inventor because of mechanical limitations. However, it is believed that higher pressures around 700 to 780 psig give a more desirable result. Water and carbon dioxide should be fed to the reactor 4 at an approximately five to one molecular weight ratio, respectively.

Given the residence time, it is preferable to include a recycle stream in the reaction process. Since, on average, 50 percent of the reactants are not consumed, the recycle stream will recycle these unreacted reactants, as well as the energy needed to heat the reactants to the reactor 4 temperature.

In theory, during the reaction the catalyst complex may be consumed in part and may lose over half of its weight over a period of twenty-four hours due to the loss of the hydrate and $CO_2$, which reaction does not occur under $CO_2$ pressure. The catalyst complex may be recharged by applying pressurized carbon dioxide at the initial pressure, i.e., at 260 to 600 psig, with some moisture to the reactor 4 for approximately one (1) hour until the catalyst complex has been reconstituted. Even without our reactant, FCCU supports which contain MgO are converted to reactant under the system's $CO_2$ pressure in 24 to 48 hours.

When coal or coal pre-cursers are used with the catalyst complex, coal gasification and liquefaction occurs. The coal reaction would be similar to those previously known coal gasification processes, though alkali metal carbonates have been previously used as the catalyst complex, as opposed to the alkaline earth complexes of the present invention. It is surprising that the magnesium complex functions as well as the alkali metal carbonates in this step of the process because the solubilities of magnesium carbonates in water are much less than those of the alkali metal carbonates and bicarbonate complexes, the mechanism by which metal carbonates catalyze methylation, as stated above. Rather, the unique properties of magnesium complexes make for a unique catalyst complex that is very water-soluble. For example, 14 grams of magnesium complex are soluble in 100 cc of cold water, while 24 grams of magnesium complex are soluble in 100 cc of hot water.

At high reactor temperatures of between about 750° C. to 800° C., generally, carbon monoxide, methane and hydrogen are produced, but at lower reactor temperatures of 560° C. to 600° C., heavier hydrocarbons may be extracted. Additionally, sulfur in the reactant stream is reduced during the reaction and sulfates are obtained, which may readily be cleansed from the product stream.

The reactor 4 should be followed by a condensation column 7 to separate the liquid components and the gaseous components of the product stream. The liquid product may be collected readily by means of a liquid collector.9 The liquid product may contain some higher weight organics or combustibles and gases that are solubilized by pressure in the liquids but in the most part consists of water. The gaseous stream will contain most of the reaction product, which will be mostly $H_2$, CO and methane and some higher molecular weight hydrocarbons such as $C_2H_6$. Such a gas stream may be purified to remove any impurities, e.g., in an aqueous caustic trap, and then collected for use. When such an aqueous caustic trap is used, the volume percent of hydrocarbons collected is increased.

EXAMPLES

Example 1

100 grams of $(MgCO_3)_4$—$Mg(OH)_2.5H_2O$ obtained from Aldrich Chemical of Milwaukee, Wis. was placed in a 1 gallon capacity stir tank chamber. 5 grams of $CaCO_3$ was added and then 2 grams of $K_2HPO_4.3H_2O$ was charged. 800 grams of water was then added to the stir tank chamber. Three-fourths of the chamber was immersed in an ethylene glycol bath which was maintained at $-2°$ C. The carbon dioxide provided the only agitation in the chamber. The chamber was rapidly pressured with unmetered $CO_2$ until the back pressure regulator opened. Afterwards, the flow rate is brought down to ensure that sufficient carbon dioxide is being passed through the system so the back pressure regulator remains open. After 8 hours, the chamber was de-pressured and the chamber head was removed. The slurry within the reactor was stirred and then poured into a beaker. The beaker was covered and placed in a refrigerator at 37° F.

25 cc of calcined alumina supports were put into a 189 cc reactor. The reactor and the portions of inlet and outlet lines extending three inches below the reactor and 6 inches above the reactor, respectively, were covered by a 4 foot long heating tape. Three thermocouples are placed on the reactor at the top of each third, and another thermocouple is placed above the reactor.

100 cc of the refrigerated slurry was poured into the reactor. The reactor was sealed and brought to 179 psig with carbon dioxide which was continuously charged at 60 cc/minute. The bottom third of the reactor was heated until the temperature stabilized at 207° C. The cold water charge was added at a rate of 16 cc/hour.

Due to the exothermic nature of the reaction, the bottom third of the reactor reached above 440° C., during which a total of 12 liters of gas were produced while 2.4 liters of carbon dioxide had been charged to the reactor. The increase in temperature is evidence of the low cost energy in the form of heat that the reaction generates. When the reactor temperatures had fallen to 150° C., 100 cc of water was charged. The reactor was shut down by stopping the water charge. Overnight, carbon dioxide was charged at 60 cc/minute at 274 psig and several runs were conducted over the next several days. The results of these runs are exemplified in the four samples set forth below.

| RESULTS OF ANALYSIS (Volume Percent) | | | | | |
|---|---|---|---|---|---|
| Sample | $CO_2$ | CO | $CH_4$ | $C_2H_6$ | $H_2$ |
| #1 | 4.76 | 25.17 | 13.29 | 0.34 | 21.13 |
| #2 | 1.66 | 18.29 | 19.36 | 0.36 | 26.59 |
| #3 | 0.53 | 23.73 | 9.49 | 0.37 | 48.92 |
| #4 | 1.39 | 3.07 | n.d. | 0.48 | 13.65 |

The balance of the contents of the gas bags was air. Sample #1 was not scrubbed. The other samples were passed through an aqueous caustic before collection.

Example 2

A mixture of 100 grams of $(MgCO_3)_4$—$Mg(OH)_2.5H_2O$, 1 gram of $K_2HPO_4.3H_2O$, 453.6 grams of Illinois #5/6 Coal, and 750 grams of distilled water were placed in a 1 gallon chamber and the chamber was sealed. Carbon dioxide was passed through the chamber with the back pressure regulator initially set at 460 psig. The lower three-quarters of the chamber was submerged into an ethylene glycol bath which was cooled from its initial temperature of 20° C. After 14 hours, the system was de-pressured and the chamber was opened and the contents were removed.

412.3 grams of the product were placed in a 500 cc tubular reactor. Carbon dioxide was continuously charged at a pressure of 274 psig. The reactor was then heated to above 240° C., after which 80 cc/hour of cold water was charged to the reactor. Due to the exothermic nature of the reactor, the temperature rose to 460° C. and remained there for at least an hour. The first gas sample was taken at 440° C. and second gas sample was taken at 460° C. At 460° C., the average gas devolution was 0.75 liters/minute. The third gas sample was taken one-half an hour later at 460° C. The average rate of gas devolution was 1 liter/minute. The fourth sample was taken an hour later at 460° C., when the rate of gas devolution was down to 0.75 liters/minute. When the fifth sample was taken an hour later at 460° C., the gas devolution was down to 0.33 liters/minute. The temperature and pressure remained constant at 460° C. and 274 psig throughout the collection of samples 2–5. After 80 liters of gas had been collected, the system was shut down. The residue in the reactor weighed 16.4 grams of the 123.1 grams charged after drying. The results of the analysis of samples 1, 3, and 5 are set forth below.

| RESULTS OF ANALYSIS (Volume Percent) | | | | | | | |
|---|---|---|---|---|---|---|---|
| Sample | $CO_2$ | CO | $H_2S$ | $CH_4$ | $C_2H_4$ | $C_2H_6$ | $H_2$ |
| #1 | 83.16 | 1.47 | 1.45 | 5.35 | 0.49 | 1.43 | 4.36 |
| #3 | 84.98 | 0.95 | 1.03 | 3.67 | 0.18 | 0.89 | 6.28 |
| #5 | 86.71 | 0.49 | 1.02 | 1.80 | n.d. | 0.17 | 5.59 |

Example 3

A mixture of 50 grams of 4 $Mg(OH)_2$—$5H_2O$, 3 grams of $K_2HPO_4.3H_2O$, and 904 grams of $H_2O$ were placed in a 4 liter stir tank chamber at 0° C. to 1° C. for 24 hours at 540 psig and the chamber was sealed. Carbon dioxide was passed through the chamber at a pressure of 540 psig.

After 5 days, the chamber was opened and 350 grams of Illinois #5/6 coal and 50 grams of $MgCO_3$—$Mg(OH)_2$—$5H_2O$ were added. Illinois #5/6 coal has a high sulfur content. Before the chamber was opened, the reactor pressure was 500 psig. The chamber was closed and $CO_2$ was charged to 650 psig pressure and the back pressure regulator was set at 650 psig to maintain the 650 psig reactor pressure.

After 2 days, the liquid contents of the chamber and coal solids were poured into a flask. The flask was attached to a Roto-Vac and the contents were dried until the dried coal solids tumbled freely and showed no dark spots. The coal solids were bottled and labeled.

Thereafter, 47.1 grams of the coal solids were placed in the reactor. 1.9 grams of the coal solids consisted of catalyst and the remaining 45.2 grams of the coal solids consisted of coal. The reactor was of the same configuration as that described in Example 1. The heating tape controller was set to 200° C. to 208° C. The back pressure regulator was set at 266 psig. $CO_2$ was charged at a rate of 60 cc/minute through a mass meter for 2 hours and 8 minutes. The $H_2O$ charge rate was between 10.8 cc/hour and 20 cc/hour. The water charge rate was increased toward the upper end of the range during the latter portion of the run. The run took 2 hours and 8 minutes. Afterwards, three gas samples were taken and analyzed. Samples #1 and #3, scrubbed of $CO_2$, both had a volume of 2 liters. The volume of Sample 2, unscrubbed, was 3 liters. The results in volume percentages are set forth below.

| RESULTS OF ANALYSIS (Volume Percent) | | | | | | | | | |
|---|---|---|---|---|---|---|---|---|---|
| Sample | $CO_2$ | CO | $N_2$ | $CH_4$ | $C_2H_4$ | $C_2H_6$ | $C_3H_6$ | $C_3H_8$ | $H_2$ | $O_2$ |
| #1 | 0.82 | n.d. | 7.28 | 45.13 | 0.94 | 8.66 | 0.89 | 2.04 | 32.13 | 2.11 |
| #2 | 56.54 | n.d. | 3.71 | 26.29 | n.d. | 1.27 | n.d. | 0.12 | 10.81 | 1.26 |
| #3 | 1.19 | n.d. | 4.35 | 69.19 | n.d. | 1.72 | n.d. | 0.18 | 21.92 | 1.27 |

Afterwards, the reactor was restarted using a $CO_2$ charge rate set to 60 cc/minute. The water charge rate ranged from 16 cc/hour to 21.1 cc/hour. After the $H_2O$ charge rate was steady, the temperature of the controller of the thermocouple above the reactor was set at 200° C. Samples of scrubbed gases were taken after the reactor was charged for 13 minutes (Sample #4), one hour and 20 minutes (Samples #5 and #6), and one hour and 40 minutes (Sample #7). Samples #4, #5, #6, and #7 all had a volume of 3,000 cc. The results in volume percentages are set forth below.

| RESULTS OF ANALYSIS (Volume Percent) | | | | | | | | | |
|---|---|---|---|---|---|---|---|---|---|
| Sample | $CO_2$ | CO | $N_2$ | $CH_4$ | $C_2H_4$ | $C_2H_6$ | $C_3H_6$ | $C_3H_8$ | $H_2$ | $O_2$ |
| #4 | n.d. | 24.12 | 5.65 | 25.64 | n.d. | n.d. | n.d. | n.d. | 42.97 | 1.62 |
| #5 | n.d. | 20.20 | 7.41 | 26.04 | n.d. | n.d. | n.d. | n.d. | 44.17 | 2.13 |
| #6 | n.d. | 12.34 | 11.41 | 11.93 | n.d. | n.d. | n.d. | n.d. | 61.26 | 3.06 |
| #7 | n.d. | 7.23 | 52.60 | 7.05 | n.d. | n.d. | n.d. | n.d. | 18.08 | 14.95 |

Afterwards, cold water was charged at a rate of 21.2 cc/hour. At that time, the $CO_2$ charge rate was set to 60 cc/minute and the reactor was heated to above 216° C. The reactor pressure was set at 278 psig by the back pressure regulator. Scrubbed gas with a volume of 18,533 cc was collected after the reactor was charged with water for 2 hours, and 2–3 liters of the scrubbed gas was taken as a sample. (Sample #8) The results in volume percentages are set forth below.

| RESULTS OF ANALYSIS (Volume Percent) | | | | | | | | | |
|---|---|---|---|---|---|---|---|---|---|
| Sample | $CO_2$ | CO | $N_2$ | $CH_4$ | $C_2H_4$ | $C_2H_6$ | $C_3H_6$ | $C_3H_8$ | $H_2$ | $O_2$ |
| #8 | n.d. | 28.43 | 9.17 | 13.52 | n.d. | n.d. | n.d. | n.d. | 46.20 | 2.68 |

I claim:

1. A catalyst produced by a method comprising the steps of mixing a magnesium carbonate/hydroxide complex, carbon dioxide and water at 200 to 780 psig and 0° to 4° C. for at least one hour, mounting said mixture on a catalyst support, and drying said catalyst.

2. A catalyst according to claim 1 wherein calcium carbonate is mixed with the magnesium carbonate/hydroxide complex.

3. A catalyst according to claim 1 wherein the catalyst support is coal.

4. A catalyst according to claim 1 wherein a phosphate is added to the magnesium carbonate/hydroxide complex.

5. A catalyst according to claim 2 wherein the catalyst support is coal.

6. A catalyst according to claim 1 wherein calcium carbonate and a phosphate is mixed with the magnesium carbonate/hydroxide complex.

7. A catalyst according to claim 4 wherein the catalyst support is coal.

8. A catalyst produced by a method comprising the steps of mixing formic acid with magnesium hydroxide, magnesium oxide, or magnesium carbonate, and combining said mixture with carbon dioxide and water at 200 to 780 psig and −1° to 4° C. for at least an hour.

9. A catalyst produced by a method comprising the steps of mixing formic acid and phosphate with magnesium hydroxide, magnesium oxide, or magnesium carbonate, and combining said mixture with carbon dioxide and water at 200 psig to 780 psig and −1° to 4° C., mounting said mixture on a catalyst support, and drying said catalyst.

10. A catalyst produced by a method comprising the step of mixing a magnesium carbonate/hydroxide complex, carbon dioxide and water at 200 to 780 psig and 0° to 4° C. for at least an hour.

11. A catalyst according to claim 10 wherein calcium carbonate is mixed with the magnesium carbonate/hydroxide complex.

12. A catalyst according to claims 10 wherein a phosphate is mixed with the magnesium carbonate/hydroxide complex.

13. A catalyst according to claim 10 wherein calcium carbonate and a phosphate are mixed with the magnesium carbonate/hydroxide complex.

* * * * *

UNITED STATES PATENT AND TRADEMARK OFFICE
CERTIFICATE OF CORRECTION

PATENT NO. : 5,516,742
DATED : May 14, 1996
INVENTOR(S) : Rollan C. Swanson

It is certified that error appears in the above-identified patent and that said Letters Patent is hereby corrected as shown below:

Title page item [76], "Inventor:", "Rollin" should read --Rollan--.

Signed and Sealed this

Twenty-third Day of May, 2000

Attest:

Q. TODD DICKINSON

*Attesting Officer*          *Director of Patents and Trademarks*